United States Patent
Andenna et al.

(10) Patent No.: US 7,159,054 B2
(45) Date of Patent: Jan. 2, 2007

(54) SYSTEM AND METHOD FOR DIGITAL PROTECTION AND CONTROL DEVICE FOR A POWER DISTRIBUTION NETWORK

(75) Inventors: Andrea Andenna, Annicco (IT); Luciano Di Maio, Milan (IT)

(73) Assignee: ABB T&D Technology Ltd. (CH)

( * ) Notice: Subject to any disclaimer, the term of this patent is extended or adjusted under 35 U.S.C. 154(b) by 0 days.

(21) Appl. No.: 10/432,725

(22) PCT Filed: Nov. 29, 2000

(86) PCT No.: PCT/EP00/12293

§ 371 (c)(1), (2), (4) Date: May 27, 2003

(87) PCT Pub. No.: WO02/45229

PCT Pub. Date: Jun. 6, 2002

(65) Prior Publication Data

US 2004/0100760 A1    May 27, 2004

(51) Int. Cl.
*G06F 13/00*  (2006.01)
*G05B 15/02*  (2006.01)
*H04M 3/00*   (2006.01)

(52) U.S. Cl. ............... 710/72; 710/8; 710/9; 710/10; 700/219; 700/291; 700/9; 700/83; 700/295; 361/683; 361/93.2

(58) Field of Classification Search ......... 710/8–10, 710/72; 361/683, 93.2; 700/219, 291, 9, 700/83, 295
See application file for complete search history.

(56) References Cited

U.S. PATENT DOCUMENTS

| 4,945,443 | A | * | 7/1990 | DeBiasi et al. ............ 361/93.1 |
| 5,557,551 | A | * | 9/1996 | Craft ............................ 702/130 |
| 5,666,256 | A | * | 9/1997 | Zavis et al. ................ 361/115 |
| 5,699,276 | A | * | 12/1997 | Roos ..................... 379/106.03 |
| 5,825,643 | A |   | 10/1998 | Dvorak et al. |
| 5,926,089 | A | * | 7/1999 | Sekiguchi et al. .......... 340/500 |
| 5,943,201 | A |   | 8/1999 | Walker et al. |
| 5,982,596 | A | * | 11/1999 | Spencer et al. ............... 361/64 |
| 6,198,402 | B1 | * | 3/2001 | Hasegawa et al. .......... 340/635 |
| 6,285,917 | B1 | * | 9/2001 | Sekiguchi et al. .......... 700/239 |
| 6,292,717 | B1 | * | 9/2001 | Alexander et al. .......... 700/293 |
| 6,308,061 | B1 | * | 10/2001 | Criss et al. ................. 455/418 |
| 6,469,629 | B1 | * | 10/2002 | Campbell et al. ........... 340/635 |
| 6,507,762 | B1 | * | 1/2003 | Amro et al. ................... 700/83 |
| 6,535,859 | B1 | * | 3/2003 | Yablonowski et al. ...... 705/412 |
| 6,789,001 | B1 | * | 9/2004 | Fabio ......................... 700/292 |
| 6,792,337 | B1 | * | 9/2004 | Blackett et al. ............. 700/295 |

FOREIGN PATENT DOCUMENTS

EP    0 725 469 A1    8/1996

* cited by examiner

*Primary Examiner*—Tammara Peyton
(74) *Attorney, Agent, or Firm*—Connolly Bove Lodge & Hutxz LLP

(57) ABSTRACT

A digital protection and control (P & C) device for a power distribution network, which comprises a computerized control unit comprising a microprocessor. The P & C device, according to the present invention, further comprises an external computerized palmtop computerized device, including a human-machine interface (HMI), which comprises a software communication platform. This software communication platform is aimed at exchanging, by means of a predefined communication channel, data/information related to the software configuration of the HMI and data/information related to the operating status of the P & C device.

11 Claims, 1 Drawing Sheet

Figure 1:
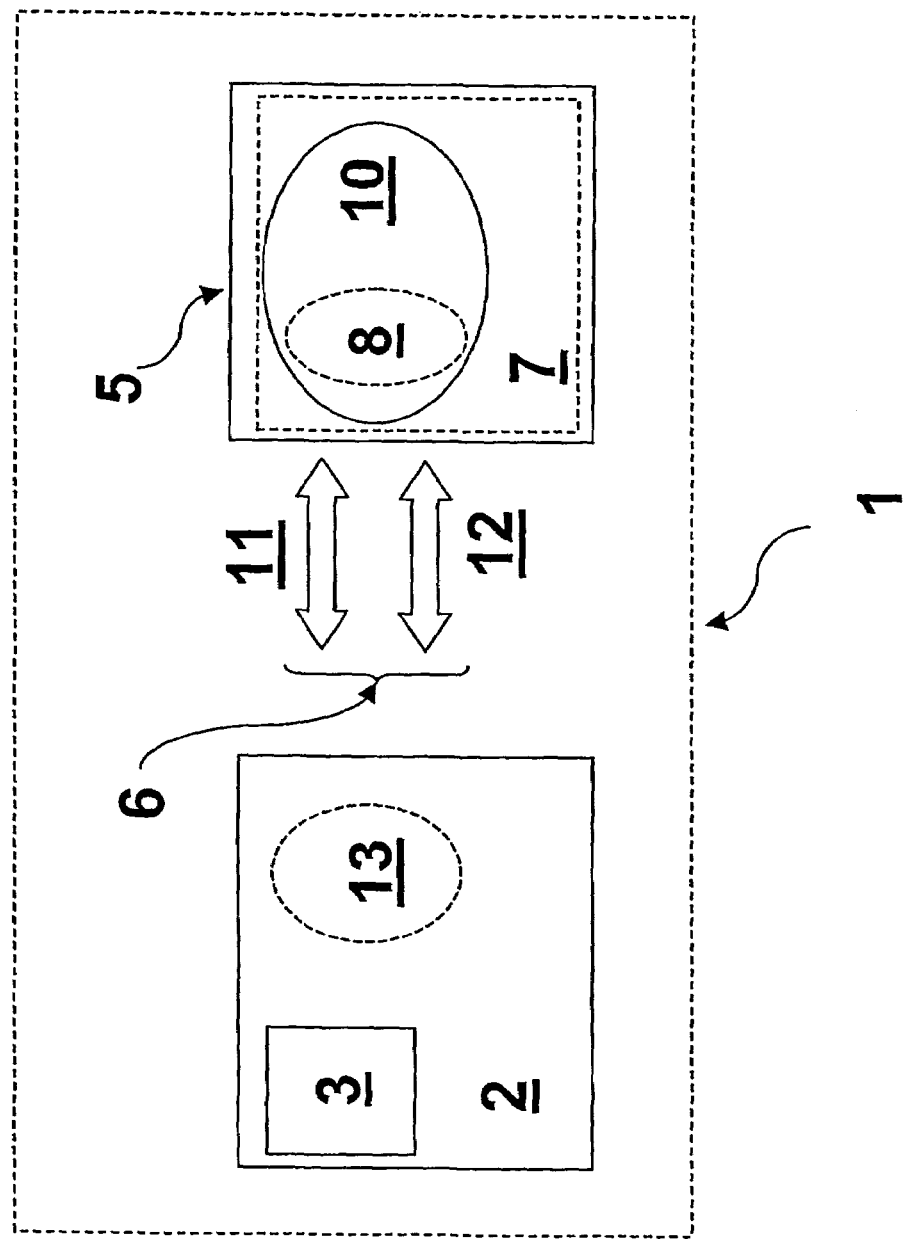

SYSTEM AND METHOD FOR DIGITAL PROTECTION AND CONTROL DEVICE FOR A POWER DISTRIBUTION NETWORK

The present invention relates to an improved protection and control (P&C) device for the use in power distribution lines or networks.

It is known that one of the main functions of a protection and control (P&C) device is to monitor the operating state of a power distribution line or network. Another important task consists of the control of the operation of primary equipment (for example tripping devices or disconnectors or the like) of the power distribution line or network, depending on the results of the monitoring activity. The functions of a P&C device are regulated by a control unit, which includes a microprocessor. Based on predefined processing strategies, the microprocessor processes data/information, which may be provided, for example, by means of predefined sensors disposed on the power distribution line/network. Based on this input information, the microprocessor provides for the digital generation of signals for regulating the functions of the P&C device.

A user is generally allowed to interact with the control unit, for example in order to set up the most appropriate processing strategies, by means of a human-machine interface (commonly called user-interface or HMI) of the P&C device. This programming activity is performed according to two main different access modes.

According to a first access mode (generally called "local access mode), the user is allowed to access directly to the HMI. For this aim, the HMI (which is called "local HMI" in this case) is generally provided with a keyboard, a display and a set of LED signals. The user may execute the programming activity by means of predefined hardware buttons that allow using suitable software menus. Further, the HMI can show directly, on its display, the data/information regarding the status of the P&C device and, more in general, it can display the results of monitoring activity, which is run by the P&C device. For example, the HMI can display data/information indicative of the scheme of the power distribution line/network protected by the digital P&C device, the status of the controlled primary equipment, the values of measurements performed by the digital P&C device, the status of the protection functions or the like.

According to a second access mode (generally called "remote access mode"), the user may access remotely to the HMI. In this case, the digital P&C device is generally interfaced towards a process bus. By means of a remote computerized apparatus (for example a SCADA system), the user is allowed to exchange data/information with the P&C device and, substantially, to perform the same operations that have been described for the local access mode. In this case, the P&C device may be also of the "blind kind" i.e. not provided with a proper keyboard or display. The remote access mode is not necessarily alternative the local access modes but both the access modes might be adopted for a digital P&C device, according to the needs.

Traditional digital P&C devices are affected by some drawbacks.

Main drawbacks are related to the local access mode to the HMI. As mentioned, this access mode requires the presence of a local HMI provided with display and keyboard. The practice has shown that the cost of a local HMI is relatively with respect to the cost of the whole digital P&C device. As a consequence, due to the need of reducing installation costs, local HMIs are generally provided with reduced processing capabilities (i.e. low graphic resolution, low processor power, low memory and the like).

Further, the programming activity has to be performed singularly for each digital P&C device, for which a local access mode is implemented. This fact implies, in case of many digital P&C devices, the need of a considerable amount of programming time, with consequent high installation/maintenance costs and high probability of programming mistakes. Also, the collection of the monitoring activity results has to be performed singularly for each P&C device. In practice, an operator is obliged to read data/information on the display of the local HMI and to report this data/information "by hand", on paper or other computerized support. This "low level" activity requires, obviously, a lot of time and it implies a high probability of mistakes, too.

Further, digital P&C devices may be installed outdoors or in hostile environments. In these cases, local access mode is quite uncomfortable and sometimes very dangerous to perform.

Most of these mentioned drawbacks could be overcome, if a remote access mode is adopted. Unfortunately, this is not always possible. In fact, a remote access mode requires the presence of a data-bus connection and, more in general, of a distributed control system (such as a SCADA system). Obviously, in most cases, this is not possible, due to the complexity and the costs of this kind of arrangements. In fact, in many power distribution lines/networks, the used P&C devices are often independent entities, which is very difficult and expensive to connect in a data-bus ring.

This fact means that, in the common practice, one can state that the drawbacks, related to the local access mode, are still felt as remarkable by the operators of the field and have not found a satisfactory solution yet.

Therefore, the main aim of the present invention is to provide a digital P&C device for a power distribution network, which allows overcoming the drawbacks mentioned above.

Within this main, another object of the present invention is to provide a digital P&C device, which allows implementing a local access mode, with improved functionality, maintaining, in the same time, the installation/maintenance costs of the digital P&C device at relatively low levels.

Another object of the present invention is to provide a digital P&C device, which allows performing, at a local level, an automatic collection of data/information from the HMI.

Another object of the present invention is to provide a digital P&C device, which allows performing, at a local level, an automatic programming of the HMI and, more in general, an automatic loading of data/information into the HMI.

Not the least object of the present invention is to provide a digital P&C device, which is easy to realize and at competitive costs.

Thus, the present invention provides a digital protection and control (P&C) device for a power distribution network, which comprises a computerized control unit comprising a microprocessor. Further, the P&C device, according to the present invention, comprises an external computerized apparatus for exchanging data/information with the computerized control unit.

The P&C device, according to the present invention, is characterized in that the external computerized apparatus comprises at least a palmtop computerized device, which comprises a human-machine interface (HMI), which comprises a software communication platform. This software communication platform is aimed at exchanging, by means of a predefined communication channel, data/information related to the software configuration of the HMI and data/information related to the operating status of the P&C device.

Further characteristics and advantages of the P&C device, according to the present invention will be better described hereinafter, with particular reference to the enclosed FIG. 1, which schematically illustrates a block diagram representing the digital P&C device, according to the present invention.

Referring now to the mentioned FIG. 1, the digital P&C device 1, according to the present invention, which, as mentioned above, is used in a power distribution line/network (not shown), comprises a computerized control unit 2, which includes a microprocessor 3. Further, the P&C device 1, according to the present invention, comprises an external computerized apparatus 5 for exchanging data/information 6 with the computerized control unit 2. The P&C device 1, according to the present invention, is characterized in that the external computerized apparatus 5 comprises at least a palmtop computerized device 7, which comprises a human-machine interface 10 (HMI). The HMI 10 makes a user able to interact with the palmtop computerized device 7 and, therefore, with the computerized control unit 2. The HMI 10 comprises a software communication platform 8, which is aimed at exchanging, by means of a predefined communication channel (not shown), data/information 11 related to the software configuration of the HMI 10 and data/information 12 related to the operating status of the P&C device 1.

The palmtop computerized device 7 may be physically constituted of a standard palmtop computer available on the market. The mentioned communication channel (not shown) may be of the wireless kind (for example a radio-frequency or an infrared or a GSM communication channel) or of the wired kind (for example a RS-232 communication port).

Preferably, the computerized control unit 2 comprises at least a software communication module 13 for supporting communication with the software communication platform 8. Advantageously, the software communication platform 8 communicates with the software communication module 13, according to a master-slave communication procedure. This master-slave communication procedure may be used for managing all the different communication flows between the software communication platform 8 and the software communication module 13. Preferably, this master-slave communication procedure comprises the steps described in the following. In a waiting step, before the communication starts, the software communication module 13 remains in an idle state and it waits for a command from the software communication platform 8. In practice, the software communication module does not perform any operation before receiving a command from the software communication platform 8. This is what happens in the following receiving step, in which the software communication module 13 receives a command from the software communication platform 8. Now, the software communication module 13 is free to perform an executing step, in which it executes the command received from the software communication platform 8. When the required task is worked out, in a response step, the software communication module 13 communicates the execution of the received command to the software communication platform 8.

The P&C device 1, according to the present invention, allows a user to implement an improved method for locally operating a digital P&C device and, in particular, for executing a local exchange of data/information with the computerized control unit 2 of the digital P&C device 1. A preferred phases of this improved method for locally operating a digital P&C device is a connecting phase, in which the palmtop computerized device 7 establishes a communication with the computerized control unit 2. The connecting phase may advantageously comprise an interrogation step, in which the software communication platform 8 checks if the software communication module 13 is ready to exchange data/information 6. In practice, in this interrogation step, the software communication platform 8 checks the status of the connection with the software communication module 13. If no problem arises, a response step, in which the software communication module 13 communicates its availability to exchange data/information 6, is performed. Further, this improved method for locally operating a digital P&C device comprises advantageously a configuration phase, in which the palmtop computerized device 7 exchanges, with the computerized control unit 2, data/information 11 related to the software configuration of the HMI 10. This configuration phase comprises preferably a starting step, in which the software communication platform 8 sends a start-up command to the software communication module 13. Once the software communication module 13 has received the mentioned start-up command, a download step may be performed. In the download step, the software communication module 13 downloads data/information 11 related to the software configuration of the HMI 10 to the software communication platform 8. Thus, a run-time phase, in which the palmtop computerized device 7 exchanges automatically, with the computerized control unit 2, data/information 12 related to the operating status of the digital P&C device 1, is performed. In particular, in a download phase, data/information, related to the operating status of the P&C device 1, may be easily downloaded from the computerized control unit 2 by the software communication platform 8. These data/information may rely on the operating status of the primary equipment or the measurements performed by the digital P&C device or related to schemes of the power distribution network or the like. In this manner, the palmtop computerized device 7 might be used as a carrier of data/information automatically retrieved on the field, directly from the P&C device. On the other side, in an upload phase, predefined parameterization commands or, more in general, data/information related to the operating status of the P&C device 1, which have to be stored/used by the control unit 2 may be automatically uploaded to the computerized control unit 2 by the software communication platform 8. In this manner, the palmtop computerized device 7 may be used as an appendix command terminal for the P&C device 1.

The P&C device 1, according to the present invention, allows achieving the intended aims and objects.

In fact, the adoption of the palmtop computerized device 7, provided with the software communication platform 8, allows overcoming the drawbacks that are typical of the described local access mode. By means of programming adequately the software communication platform, improved processing performances may be achieved. In fact, the processing capabilities of the palmtop computerized device may be powered, according to the needs.

In the same time, the overall installation costs of the P&C device 1 can be kept relatively low due to the fact that computerized control unit 2 needs no more display or keyboard means.

Further, the adoption of the palmtop computerized device 7, provided with the software communication platform 8, allows performing easily, at a local level, the automatic collection of data/information from the computerized control unit 2, thus reducing the time and costs for recording the status of the P&C device.

The adoption of the palmtop computerized device 7, provided with the software communication platform 8, allows also performing easily, at a local level, the automatic programming of the computerized control unit 2 and, more in general, an automatic loading of data/information into the control unit 2. In this manner, the probability of making mistakes during the programming activity is drastically reduced as well as the programming time and costs.

Further, the digital P&C device 1, according to the present invention, has proven, in practice, to be of easy realization and at competitive costs.

The digital P&C device, according to the present invention, thus conceived is susceptible of numerous modifications and variations, all of which are within the scope of the inventive concept. All the details may also be replaced with other technically equivalent elements. In practice, the materials employed, so long as they are compatible with the specific use, as well as the dimensions, may be any, according to the requirements and to the state of the art

The invention claimed is:

1. A digital P&C device for a power distribution network comprising:
   a computerized control unit further comprising;
      a microprocessor; and
      a software communication module for supporting communication with devices external to said computerized control unit; and
   an external computerized apparatus for exchanging data/information with said computerized control unit, said external computerized apparatus further comprising:
      at least a palmtop computerized device provided with a human-machine interface further comprising:
         a software communication platform that communicates with said software communication module by means of a predefined communication channel, said software communication platform uploading to and downloading from said software communication module predefined data/information related to the software configuration of said human-machine interface and predefined data/information related to the operating status of said P&C device, said software communication platform communicating with said software communication module according to a master-slave communication procedure, which involves the following subsequent steps;
         a waiting step, in which said software communication module waits for a command from said software communication platform;
         a receiving step, in which said software communication module receives a command from said software communication platform;
         an executing step, in which said software communication module executes the command received from said software communication platform;
         a response step, in which software communication module communicates the execution of the received command to said software communication platform;
         said communication procedure being at least one of preceded and followed by at least one of the following phases:
            a download phase, in which said software communication platform automatically downloads data/information related to the operating status of said P&C device, from said computerized control unit; and
            an upload phase, in which said software communication platform automatically uploads data/information related to the operating status of said P&C device, into said computerized control unit.

2. A method for locally operating a digital P&C device for a power distribution network according to claim 1, further comprising:
   a connecting phase, wherein said palmtop computerized device establishes a communication with said computerized control unit;
   a configuration phase, wherein said palmtop computerized device exchanges, with said computerized control unit data/information related to the software configuration of said human-machine interface; and
   a run-time phase, wherein said palmtop computerized device exchanges, with said computerized control unit, data/information related to the operating status of said P&C device.

3. The method of claim 2, wherein said connecting phase further comprises:
   an interrogation step, in which the software communication platform of said palmtop computerized device checks if the software communication module of said computerized control unit is ready to exchange data/information; and
   a response step, in which the software communication module of said computerized control unit communicates its availability to exchange data/information.

4. A method, according to claim 3, wherein said configuration phase further comprises:
   a starting step, in which the software communication platform of said palmtop computerized device sends a start command to the software communication module of said computerized control unit; and
   a download step, in which the software communication module of said human-machine interface downloads data/information related to the software configuration of said human-machine interface to the software communication platform of said palmtop computerized device.

5. A method, according to claim 2, further comprising at least one of the following phases;
   a download phase, in which said software communication platform automatically downloads data/information related to the operating status of said P&C device, from said computerized control unit; and/or
   an upload phase, in which said software communication platform automatically uploads data/information related to the operating status of said P&C device, into said computerized control unit.

6. A method, according to claim 3, further comprising at least one of the following phases;
   a download phase, in which said software communication platform automatically downloads data/information related to the operating status of said P&C device, from said computerized control unit; and/or
   an upload phase, in which said software communication platform automatically uploads data/information related to the operating status of said P&C device, into said computerized control unit.

7. A method, according to claim 4, further comprising at least one of the following phases:
   a download phase, in which said software communication platform automatically downloads data/information related to the operating status of said P&C device, from said computerized control unit; and/or an upload phase, in which said software communication platform automatically uploads data/information related to the operating status of said P&C device, into said computerized control unit.

8. A digital P&C device, according to claim 1, wherein said predefined communication channel is a wireless channel.

9. A digital P&C device, according to claim 1, wherein said predefined communication channel is a wired channel.

10. A digital P&C device, according to claim 8, wherein the wireless channel is at least one of a radio-frequency, infrared and GSM communication channel.

11. A digital P&C device, according to claim 9, wherein the wired channel is a RS-232 communication port.

* * * * *

UNITED STATES PATENT AND TRADEMARK OFFICE
CERTIFICATE OF CORRECTION

| | | |
|---|---|---|
| PATENT NO. | : 7,159,054 B2 | Page 1 of 1 |
| APPLICATION NO. | : 10/432725 | |
| DATED | : January 2, 2007 | |
| INVENTOR(S) | : Andenna et al. | |

It is certified that error appears in the above-identified patent and that said Letters Patent is hereby corrected as shown below:

Title page Item (73) Assignee to read as follows:

ABB TECHNOLOGY AG (CH)

Signed and Sealed this

Twentieth Day of July, 2010

David J. Kappos
*Director of the United States Patent and Trademark Office*